United States Patent
Calvarese et al.

(10) Patent No.: US 10,816,638 B2
(45) Date of Patent: Oct. 27, 2020

(54) ULTRASONIC LOCATIONING INTERLEAVED WITH ALTERNATE AUDIO FUNCTIONS

(71) Applicant: SYMBOL TECHNOLOGIES, INC., Schaumburg, IL (US)

(72) Inventors: Russell E Calvarese, Stony Brook, NY (US); Sean A Connolly, Stonybrook, NY (US); Janine E Dubois, Mastic Beach, NY (US); Richard J Lavery, Huntington, NY (US); Sean D Marvel, Hampton Bays, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1025 days.

(21) Appl. No.: 14/487,194

(22) Filed: Sep. 16, 2014

(65) Prior Publication Data

US 2016/0077192 A1 Mar. 17, 2016

(51) Int. Cl.
*G01S 3/80* (2006.01)
*G01S 5/26* (2006.01)
(Continued)

(52) U.S. Cl.
CPC .............. *G01S 5/26* (2013.01); *G01S 1/74* (2013.01); *G01S 1/80* (2013.01)

(58) Field of Classification Search
USPC .......................................................... 367/118
See application file for complete search history.

(56) References Cited

U.S. PATENT DOCUMENTS 4,827,395 A * 5/1989 Anders .................. G01S 13/78
340/10.1
5,318,027 A * 6/1994 Fukui .................... G01S 15/899
600/437
(Continued)

FOREIGN PATENT DOCUMENTS

DE 102010033384 A1 * 2/2012 ............. G01S 7/023
EP 2065726 A2 6/2009
(Continued)

OTHER PUBLICATIONS

Filonenko, Viacheslav, Charlie Cullen, and James Carswell. "Investigating ultrasonic positioning on mobile phones." Indoor Positioning and Indoor Navigation (IPIN), 2010 International Conference on. IEEE, 2010.*

(Continued)

*Primary Examiner* — Hovhannes Baghdasaryan
*Assistant Examiner* — Jonathan D Armstrong
(74) *Attorney, Agent, or Firm* — Yuri Astvatsaturov

(57) ABSTRACT

Ultrasonic locationing interleaved with alternate audio functions includes a plurality of transmitters for emitting ultrasonic bursts and alternate audio signals. A backend controller schedules the ultrasonic bursts and alternate audio signals from each transmitter. The backend controller can characterize an interference effect of defined interference parameters for each alternate audio signal, with respect to the ultrasonic bursts, and modify interleave scheduling of the ultrasonic bursts and alternate audio signals in accordance with the respective interference effect. A mobile device can receive the ultrasonic bursts for locationing of the mobile device, while a user or other device that can act on information in the alternate audio signals. Input from a user to an interface device can trigger the backend controller to sched- (Continued)

ule an alternate audio signal containing information related to the input.

20 Claims, 2 Drawing Sheets

(51) Int. Cl.
  *G01S 1/74* (2006.01)
  *G01S 1/80* (2006.01)

(56) References Cited

U.S. PATENT DOCUMENTS

| | | | | |
|---|---|---|---|---|
| 6,069,696 | A * | 5/2000 | McQueen | G01G 19/4144 235/383 |
| 6,130,858 | A | 10/2000 | Felesky | |
| 7,192,387 | B2 | 3/2007 | Mendel | |
| 7,394,380 | B2 | 7/2008 | Ballin | |
| 7,406,256 | B1 | 7/2008 | Adolph | |
| 7,788,033 | B2 | 8/2010 | Isaji | |
| 8,009,112 | B2 | 8/2011 | Buer et al. | |
| 8,719,102 | B1 | 5/2014 | DiMartino | |
| 2002/0075282 | A1* | 6/2002 | Vetterli | G01C 21/20 345/632 |
| 2002/0138273 | A1* | 9/2002 | Raman | G06K 19/06028 704/270 |
| 2003/0142587 | A1* | 7/2003 | Zeitzew | G01S 7/52004 367/127 |
| 2003/0209893 | A1* | 11/2003 | Breed | B60J 10/00 280/735 |
| 2003/0227382 | A1* | 12/2003 | Breed | G06Q 20/203 340/539.13 |
| 2004/0111360 | A1* | 6/2004 | Albanese | G06Q 40/025 705/38 |
| 2004/0129478 | A1* | 7/2004 | Breed | B60N 2/002 180/273 |
| 2004/0260470 | A1* | 12/2004 | Rast | G06Q 10/06 701/300 |
| 2005/0011959 | A1 | 1/2005 | Grosvenor | |
| 2005/0035862 | A1 | 2/2005 | Wildman et al. | |
| 2005/0046584 | A1* | 3/2005 | Breed | B60C 11/24 340/13.31 |
| 2006/0082457 | A1* | 4/2006 | Artem | G06Q 10/06 340/572.1 |
| 2008/0146924 | A1* | 6/2008 | Smith | G01S 7/52017 600/437 |
| 2008/0191864 | A1* | 8/2008 | Wolfson | G06F 3/011 340/524 |
| 2011/0060225 | A1* | 3/2011 | Cogan | B06B 1/0207 600/459 |
| 2012/0173351 | A1* | 7/2012 | Hanson | G06Q 20/204 705/17 |
| 2012/0228392 | A1* | 9/2012 | Cameron | H05K 7/20427 236/34 |
| 2013/0017849 | A1* | 1/2013 | Cordeiro | H04B 7/0682 455/501 |
| 2013/0077446 | A1* | 3/2013 | Kasper | A01M 29/18 367/139 |
| 2013/0083631 | A1 | 4/2013 | Harrell et al. | |
| 2014/0043943 | A1* | 2/2014 | Lavery | G01S 1/74 367/118 |
| 2014/0342834 | A1* | 11/2014 | Tappeiner | A63H 30/04 463/42 |
| 2015/0168154 | A1* | 6/2015 | Boerger | G01C 21/206 701/410 |
| 2016/0292881 | A1* | 10/2016 | Bose | G06K 9/00342 |

FOREIGN PATENT DOCUMENTS

| | | |
|---|---|---|
| EP | 1873013 B1 | 3/2013 |
| GB | 2319376 A | 5/1998 |
| WO | 20120093345 A1 | 7/2012 |

OTHER PUBLICATIONS

Angeles, Rebecca. "RFID technologies: supply-chain applications and implementation issues." Information systems management 22.1 (2005): 51-65.*

Medical Imaging Physics, Fourth Edition, by William R. Hendee and E. Russell Ritenour ISBN: 0-471-38226-4 Copyright C° 2002 Wiley-Liss, Inc.*

International Search Report and Written Opinion dated Oct. 16, 2015 in counterpart PCT application PCT/US2015/044967.

* cited by examiner

ULTRASONIC LOCATIONING INTERLEAVED WITH ALTERNATE AUDIO FUNCTIONS

BACKGROUND

A plurality of ultrasonic transmitters that are installed in fixed, known positions can be used to establish the location of devices that can receive ultrasonic signals from these transmitters, such as a mobile device present within a retail, factory, or warehouse environment, for example. Each ultrasonic transmitter includes an emitter (e.g. transducer or speaker) that can transmit ultrasonic energy in a short (two millisecond) burst which can be received by a microphone in the mobile device. For example, today's unmodified smart phones have audio hardware and circuitry that is capable of receiving ultrasonic signals in the 20-22 kHz frequency range. In particular, the use of several ultrasonic transmitters within the environment is used to provide a specific location of a particular device using differential flight time techniques known in the art, including Time Difference of Arrival (TDOA) techniques, that incorporate triangulation, trilateration, multilateration, and the like, to establish a location of a mobile device.

Flight time based ultrasonic locationing systems typically have a very specific design. Typical systems include a specific scheduling control process and communication infrastructure. In particular, the control process is required to time slice synchronized ultrasonic emitter groups (clusters) such that adjacent clusters don't interfere with each other, i.e. a mobile device does not confuse signals from different emitters. Even so, there are significant periods when each ultrasonic emitter is idle. It would be beneficial if the ultrasonic emitters could be used for alternative audio functions in the environment when they are not being used during those short periods for ultrasonic locationing. However, it should be recognized that these alternative audio functions could also present interference while other emitters are performing their ultrasonic locationing function.

Accordingly, there is a need for a technique to alleviate the above issues in an ultrasonic locationing system co-existing with alternative audio functions without requiring modifications to existing hardware.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
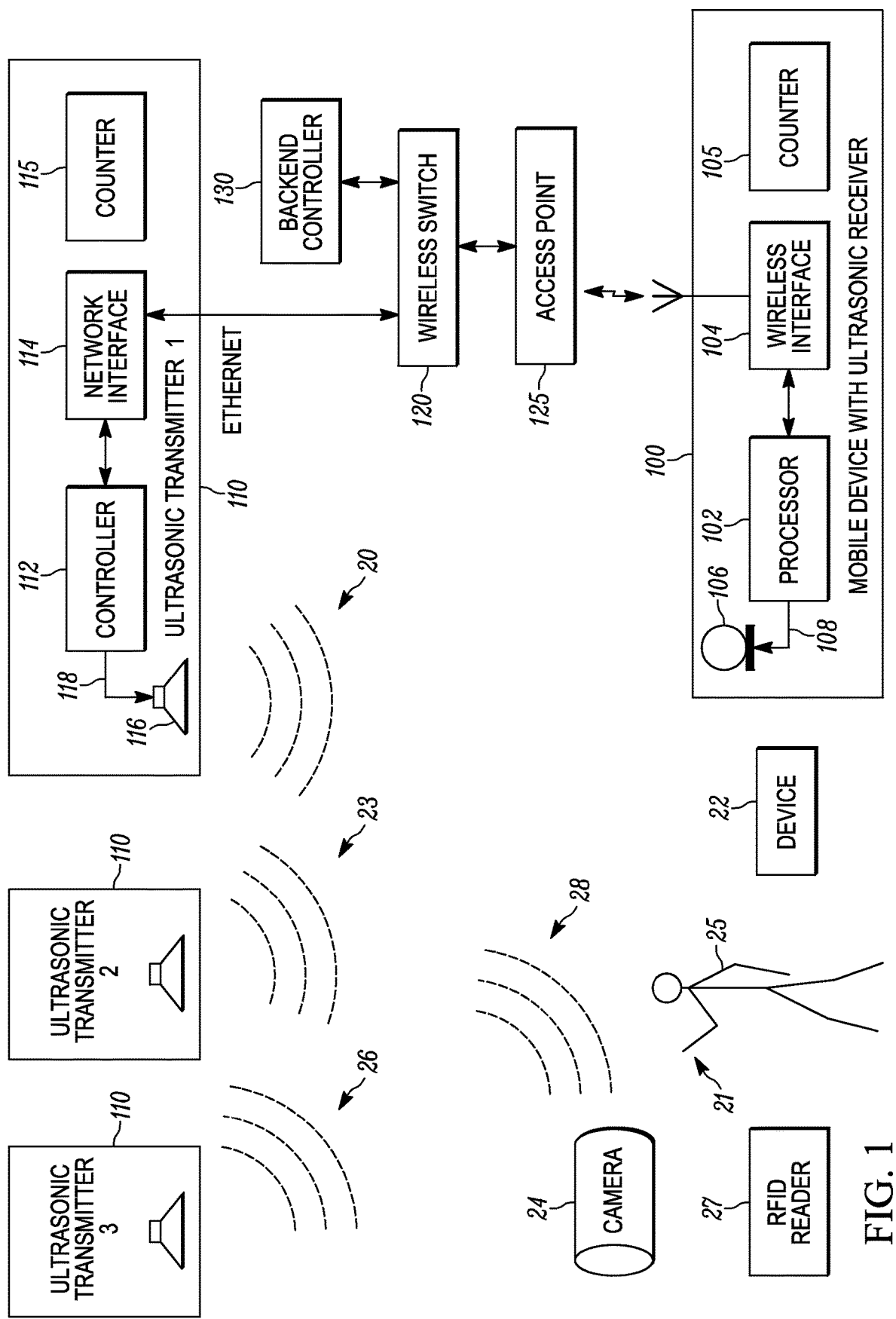
FIG. 1 is a block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a technique is described to provide an ultrasonic locationing system co-existing with alternative audio functions without requiring modifications to existing hardware in the ultrasonic locationing system or mobile devices. In particular, the present invention determines interference parameters for each alternate audio function with respect to the ultrasonic locationing system, and uses these interference parameters to interleave the locationing and alternative audio function scheduling of the emitters accordingly. Therefore, the present invention schedules locationing emitter bursts in cooperation with alternative audio function in order to avoid collisions and interference so that a mobile device can hear and respond to ultrasonic locationing signals without conflict with the alternative audio functions.

The device to be locationed can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a device. Each device comprises a processor that can be further coupled to a keypad, a speaker, a microphone, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, controllers, transceivers, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of a system, in accordance with the present invention. The system is operable for ultrasonic locationing and alternate audio functions. An ultrasonic transponder such as a piezoelectric speaker or emitter 116 can be implemented within each ultrasonic transmitter 110. Each emitter can send a short burst 20, 23, 26 of ultrasonic sound (i.e. 19-22 kHz) for a mobile device 100 to hear within the environment in order to establish a location of the mobile device. Although only three transmitters are represented, it should be realized that many more emitters could be deployed within the environment. When it is not emitting an ultrasonic burst, each emitter can also provide an alternative audio function by emitting an audio signal 28 containing information, where the audio signal as defining herein can be audible or ultrasonic (i.e. above 20 Hz). The mobile device 100 can include a transducer such as an existing microphone 106 to receive the bursts 20, 23, 26. The mobile device also includes existing audio circuitry to convert the bursts into an electrical signal 108. The mobile device also includes an existing processor 102 to convert and process the signal to determine the timing that each burst is received for establishing the location of the mobile device. The processor can include an amplifier, filter, analog-to-digital converter, and digital signal processor, as are known in the art. The processor 102 can also be coupled to a wireless local area network interface 104 for wireless communication with other devices in a communication network.

The communication network can include local and wide-area wireless networks, wired networks, or other IEEE 802.11, IEEE 802.15, or Wi-Fi™ wireless communication systems, including virtual and extended virtual networks. It is envisioned that the communication network includes a backend controller/scheduler 130 that performs scheduling control and provides the locationing engine. The backend controller can be connected to a network switch 120 which can be wired (e.g. an Ethernet interface connection) or wirelessly (e.g. IEEE's 802.11 or Wi-Fi™) connected to the plurality of ultrasonic transmitters 110, and at least one wireless access point 125 used for communicating with the mobile devices 100.

It should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

In order to provide locationing ability, using a flight time technique for example, the present invention utilizes a plurality of ultrasonic transmitters 110 within the environment each carrying an emitter 116. For unobtrusiveness and clear signaling, the transmitters can be affixed to a ceiling of the environment, where the position of each transmitter is fixed and known by the backend controller 130. In order to avoid interference between ultrasonic bursts, the backend controller schedules when each transmitter will emit its burst, taking into account ultrasonic flight times, reflections, and reverberations. This will ensure that emitters in nearby region do not emit their ultrasonic burst at times when they might collide at the mobile device or cause interference.

The flight time information of each burst received from different transmitters 110 is used to locate the mobile device. As the location and position of these transmitters 110 is known and fixed, the different signals received by the mobile device microphone from each transmitter can be used to locate and track the position of the mobile device using flight time information using a suitable locationing technique. For example, the backend controller can use the flight time information from the mobile device of bursts 20, 23, 26 received by the mobile device from different transmitters to determine the location of the mobile device. It should be noted that the radio frequency communications are relatively instantaneous next to the flight time of the ultrasonic signal and therefore the communication time over Wi-Fi™ can be ignored. Using a locationing technique such as triangulation, trilateration, multilateration, and the like, along with the flight times, the backend controller can determine the location of the mobile device accurately and also track its position during subsequent bursts from the transmitters. Alternatively, the mobile device could receive the scheduled emission time for each emitter from the backend controller, and use this only with its measured timing information of each burst in order to establish its own location.

In practice, the mobile device 100 will not know which particular transmitter is emitting which ultrasonic burst 20, 23, 26. Therefore, some control over each emitter must be exercised in order to know which emitter is transmitting, when it is transmitting, and which emitter is located at which position. In one embodiment, the backend controller 130 of the locationing system can communicate over the communication network in order to direct the different emitters 116 to emit an ultrasonic burst at different times such that a mobile device will not receive overlapping signals from different emitters. This can be accomplished using IEEE 802.11 polling to initiate each ultrasonic burst. For example, the backend scheduler can communicate with ultrasonic transmitter 1 to cause it to transmit an ultrasonic burst at a time reserved for ultrasonic transmitter 1. Upon receiving the burst, the device 100 can communicate with the backend controller over the communication network that it has received the burst (along with timing information), and the backend controller will then know that the burst came from ultrasonic transmitter 1 due to the general time it was received by the mobile device.

During times when the transmitters 110 are not emitting ultrasonic bursts 20, 23, 26, for locationing purposes, the backend controller can direct particular transmitters (e.g. ultrasonic transmitter 3) to transmit alternate audio information in an audio signal 28, such that a user or other device can act on the alternate audio information. The backend controller is operable to interleave the scheduling of the ultrasonic bursts and alternate audio signals for the transmitters. However, different alternate audio signals can present different risks of interference with the ultrasonic bursts, and the interleave scheduling will take this into account, in accordance with the present invention.

Therefore, in order to avoid particular interference events between the interleaved ultrasonic bursts and audio signals, interference parameters for each alternate audio function are defined. Specifically, the interference parameters define sound pressure level, frequency, reverberation time and timing requirements of each alternate audio function. For example, the trivial case would be where a particular alternate audio function presents no interference (e.g. completely different frequency) with the ultrasonic bursts, allowing the scheduler complete freedom to schedule the alternate function at any time. The more typical case, where there might be at least some possibility of interference between the ultrasonic bursts and the alternate audio signal, would require schedule interleaving, wherein the alternate audio signal is only sent when the transmitters are not transmitting ultrasonic bursts and the mobile device will not be receiving these ultrasonic bursts.

Some power supply/amplifier designs in the controller 112 do not allow for continuous operation due to heating or voltage drop restrictions. For example, some amplifiers for driving an ultrasonic speaker can only run 5% duty cycle at 100 percent amplitude before the power supply voltage drops to critical levels. Accordingly, with respect to the present invention, as part of the characterization, each alternate audio function would have its power profile characterized by the backend controller. Then the scheduler can interleave each alternate audio function without exceeding any heating or voltage drop limits of the power profile, while fully servicing all requested alternate audio functions. Therefore, any duty cycle restrictions of the amplifiers/power supplies of the transmitters are accounted for at this scheduling step.

In practice, the backend controller can characterize the interference effect of alternate functions on ultrasonic locationing, in real time, and considering the current ultrasonic burst scheduling sequence. The backend controller can then modify the scheduler to interleave the alternate audio functions optimizing the time resource, considering how the alternate audio functions affect ultrasonic locationing. It is envisioned that in all the alternate audio function scenarios presented below, existing hardware is used with suitable firmware or software modifications.

Therefore, in one embodiment, the present invention includes a system for ultrasonic locationing interleaved with alternate audio functions. The system includes a plurality of transmitters 110 operable to emit ultrasonic bursts 20, 23, 26 and alternate audio signals 28. A backend controller 130 includes a scheduler operable to schedule the ultrasonic bursts and alternate audio signals from each transmitter. The backend controller is operable to characterize an interference effect of defined interference parameters for each alternate audio signal, with respect to the ultrasonic bursts. Input supplied from a user 25 to an input or user interface device 24, 27, 104, 106 triggers the backend controller 130 to schedule an alternate audio signal 28 containing information related to the input. The scheduler of the backend controller is also operable to schedule and modify the scheduled interleaving of the ultrasonic bursts and alternate audio signals in accordance with the respective interference effect. A mobile device 100 is operable to receive the ultrasonic bursts 20, 23, 26 for locationing of the mobile device, while a user 25 or other device 22 that can act on information in the alternate audio signals 28. The input interface 24, 27, 104, 106 is at least one of the group of a video camera, a wireless communication interface, a Radio Frequency Identification reader, and an audio interface, such as microphones at known locations within the environment.

The present invention provides a feedback mechanism between the input interface and the alternate audio functions. In one example, the input interface is a video camera 24. The camera can be integrated into a user device (e.g. mobile device 100) or a standalone device in the environment (as shown). In either case the camera 24 can communicate with the backend controller 130. One type of input to the input interface is a (hand) gesture 21 that can signal that help is needed, a task is complete, replenishment of stock is needed, etc. The particular gesture can be forwarded to the backend controller for visual recognition. Upon recognition, the backend controller can schedule an alternate audio signal containing information in audible form that includes directions for the user to take in response to the particular gesture.

For example, if the user gives a gesture that more stock is needed, the audible feedback provided to the user is an acknowledgement that stock recognized by the camera 24 is needed, or that the user should scan one of the needed items on a barcode reader or Radio Frequency Identification reader 27 coupled to the backend controller to inform the controller of the particular item needing restocking. Optionally, the backend controller can note a location of the gesture 21 by the camera 24 where various functionality and feedback based on the location can be provided by the audible feedback.

In another example, the input interface is again a video camera 24. The camera can be integrated into a user device (e.g. mobile device 100) or a standalone device in the environment (as shown). In either case the camera 24 can communicate with the backend controller 130. One type of input to the input interface is a user 25 presenting an object to the camera. An image of the object can be captured and forwarded to the backend controller for visual recognition. Upon recognition, the backend controller can schedule an alternate audio signal containing information in audible form that includes either a price of the object, a quantity of the object in stock, and/or acknowledgement to replenish the stock of the object. This could potentially allow customers to interact with the store via their actions and audible feedback. No mobile device would be needed.

In another example, the input interface is a Radio Frequency Identification reader 27 that can communicate with the backend controller 130. One type of input to the input interface is a user 25 placing an object near the reader to be read by the reader to determine an identity of the object. The identification of the object can be forwarded to the backend controller, whereupon the backend controller can schedule an alternate audio signal containing information in audible form that includes a price of the object for the user. Optionally, the input interface also includes the video camera 24 that provides video to the backend controller so that the backend controller can verify that the object being read by the Radio Frequency Identification reader is being moved by the user. In this way, a customer could request information, such as a price check, about the item being moved about. The price check would be given as audible feedback in response to the object being moved.

In another example, the input interface is again a video camera 24. The camera can be integrated into a user device (e.g. mobile device 100) or a standalone device in the environment (as shown). In either case the camera 24 can communicate with the backend controller 130. One type of input to the input interface is capturing an image of an event by the camera. The image of the event is forwarded to the backend controller for visual recognition. Upon recognition, the backend controller can schedule an alternate audio signal containing information in ultrasonic form to change a state of a device. For example, the ultrasonic information can be used to change a price on a display device 22 or shelf label, turn on/off a device 22, etc.

Along these lines in another example, the input interface is again a video camera 24. The camera can be integrated into a user device (e.g. mobile device 100) or a standalone device in the environment (as shown). In either case the camera 24 can communicate with the backend controller 130. One type of input to the input interface is capturing an image of the user by the camera. The image of the user is forwarded to the backend controller for facial recognition. If the facial recognition verifies the user as being authorized, the backend controller can schedule an alternate audio signal containing information in ultrasonic form to unlock a device

22 to permit access for the user. For example, instead of asking a customer to find a store associate to come and unlock a cabinet for them to purchase an item, the present invention can automatically unlock the cabinet if the customer can be verified. In addition, the camera can accurately track the customer through a point-of-sale to verify payment has been made.

In another example, the input interface is a sensor, and wherein the input is an alert provided by the sensor, which is forwarded to the backend controller, whereupon the backend controller can schedule an alternate audio signal containing the alert information to the user 25 or other device 22. For example, the alternate audio signal can be an ultrasonic signal sent to low-cost tags or mobile computers as an alarm or notification to alert store associates or store security of an event without requiring a separate radio. The event could include a security alert, fire, burglary, etc.

In another example, the input interface is an audio interface 106 in the mobile device 100 able to detect a Doppler shift in an ultrasonic burst 26, which would indicate motion of the mobile device, and wherein the input is an indication that the mobile device is moving, which is forwarded to the backend controller, whereupon the backend controller can schedule an alternate audio signal for improved motion detection. For example, it may be possible to use an ultrasonic burst 26 for at least part of the motion detection function, i.e. a timed reflection from a nearby object can establish that an object is close. To determine if an object is moving, a longer pulse may be needed to obtain an accurate Doppler measurement of the pulse. Therefore an alternate audio signal could be a longer (i.e. greater than two millisecond) ultrasonic pulse 28 containing improved Doppler information over the ultrasonic burst, where the longer pulse could provide better motion detection performance.

In another example, the input interface is a timer, and wherein the input is an alert provided by expiry of the timer, whereupon the backend controller can schedule an alternate audio signal containing an ultrasonic signal to generate loud noise. This can be used as a pest deterrent by generating a loud ultrasonic noise (e.g. 200 W at 20 kHz, 116 dB sound pressure level). Due to transmitter devices 110 that utilize the ultrasonic locationing system being warm and providing cover, pests such as birds, rodents, insects, and the like may be inclined to congregate on and in these devices. In this example, the ultrasonic frequency and sensitivity of that frequency will annoy animals from populating devices and therefore help in preventing damage from such animals, as well as extending the time between maintenance on such devices.

In another example, the input interface is an audio interface 106 able to detect noise in the environment, and wherein the input is a noise level, which is forwarded to the backend controller to determine a location of the noise (corresponding to the location of the mobile device) and whether the noise level is more than a normal noise level at that location, whereupon the backend controller can schedule an alternate audio signal containing information to direct associates to that location. This could be used to detect high noise levels due to high traffic areas in a retail store and direct store associates to these areas for customer assistance.

In another example, the input interface is an audio interface able to detect noise in the environment, and wherein the input is a noise level, which is forwarded to the backend controller to determine if the noise level is more than a threshold, whereupon the backend controller can schedule an alternate audio signal containing emergency information for people within the environment. This could be used to trigger a high noise event indicating an emergency and direct store personnel and customer to follow emergency procedures.

Figure 2:
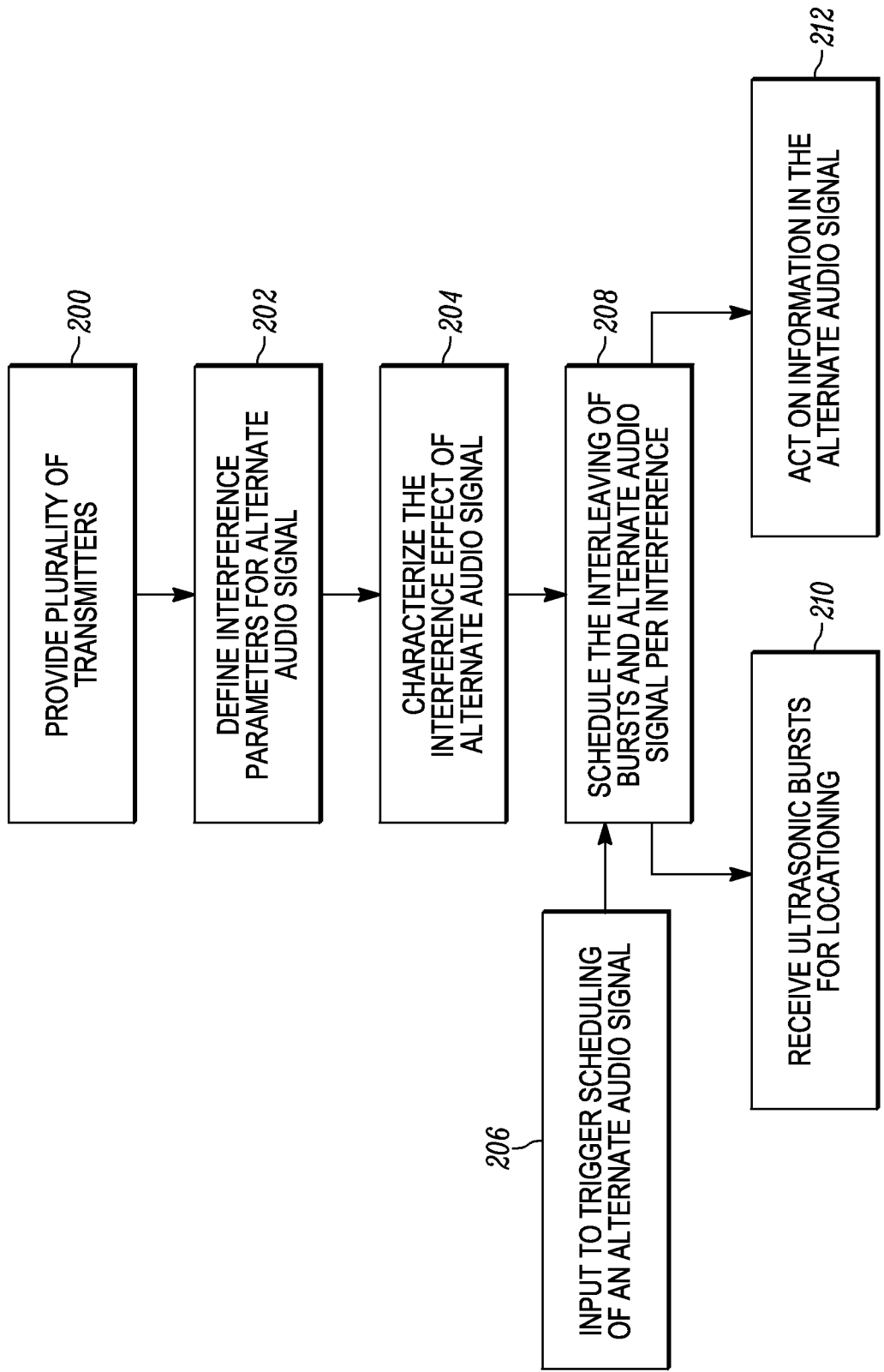
FIG. 2 is a flow diagram illustrating a method, in accordance with some embodiments of the present invention.

FIG. 2 is a diagram illustrating a method for ultrasonic locationing interleaved with alternate audio functions, according to some embodiments of the present invention.

A first step 200 includes providing a plurality of transmitters operable to emit ultrasonic bursts and audio signals that include either audible or ultrasonic information.

A next step 202 includes defining interference parameters for each alternate audio signal.

A next step 204 includes characterizing an interference effect of the defined interference parameters for each alternate audio signal with respect to the ultrasonic bursts.

A next step 206 includes supplying input to trigger scheduling of an alternate audio signal containing information related to the input.

A next step 208 includes scheduling interleaving of the ultrasonic bursts and alternate audio signals from each transmitter in accordance with the respective interference effect.

A next step 210 includes receiving the ultrasonic bursts for locationing of a mobile device.

Another step 212 includes acting on information in the alternate audio signals.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for ultrasonic locationing, comprising:
a plurality of transmitters, each of the plurality of transmitters operable to emit a first audio signal and a second audio signal, the first audio signal being an ultrasonic burst emitted at a first frequency, the second signal being emitted at a second frequency that is different from the first frequency;
a controller communicatively coupled to each of the plurality of transmitters, the controller operable to:
instruct each of the plurality of transmitters to emit the first audio signal pursuant to a predefined scheduling sequence;
determine an interference effect of the second audio signal on the first audio signal;
based on the interference effect, determine an interference parameter for the second audio signal, the interference parameter causing an avoidance of an interference between the first audio signal and the second audio signal; and
instruct at least some of the plurality of transmitters to emit the second audio signal pursuant to the interference parameter; and
a mobile device communicatively coupled to the controller, the mobile device being operable to receive the first audio signal and communicate a receipt of the first audio signal to the controller.

2. The system of claim 1, wherein the second frequency is ultrasonic.

3. The system of claim 1, wherein the second frequency is audible.

4. The system of claim 1, wherein the controller is further operable to determine the interference effect of the second audio signal on the first audio signal emitted pursuant to the predefined scheduling sequence.

5. The system of claim 1, further comprising an input device coupled to the controller, wherein an input supplied from the input device triggers the controller to schedule the transmission of the second audio signal, the second audio signal containing information related to the input.

6. The system of claim 5, wherein the input is at least one of a camera, a wireless communication interface, a radio frequency identification reader, an alarm, a sensor, a timer, and an audio interface.

7. The system of claim 5,
wherein the input device is a camera,
wherein the input is a gesture from a user, the gesture being recognizable by the controller, and
wherein the controller is operable to schedule the transmission of the second audio signal containing information in audible form, the information including directions for the user to take in response to the input.

8. The system of claim 7, wherein the user is at a location, the location being recognizable by the controller, and wherein the directions are based at least in part on the location.

9. The system of claim 5,
wherein the input device is a camera,
wherein the input is a presenting an object to the camera, the object being recognizable by the controller, and
wherein the controller is operable to schedule the transmission of the second audio signal containing information in audible form, the information including at least one of a price of the object, a quantity of the object in stock, and acknowledgement to replenish the stock of the object.

10. The system of claim 5,
wherein the input device is a radio frequency identification (RFID) reader,
wherein the input is a placing an object near the RFID reader to be read by the RFID reader, the object being recognizable by the controller, and
wherein the controller is operable to schedule the transmission of the second audio signal containing information in audible form, the information including at least one of a price of the object, a quantity of the object in stock, and acknowledgement to replenish the stock of the object.

11. The system of claim 5,
wherein the input device is a camera,
wherein the input is a capture of an image, the image being recognizable by the controller,
wherein the controller is operable to schedule the transmission of the second audio signal at an ultrasonic frequency, and
wherein the mobile device is operative to change from a first state to a second state in response to receiving the second audio signal.

12. The system of claim 11,
wherein the first state is a locked state,
wherein the second state an unlocked state,
wherein the image is that of a user, and
wherein, the controller is operable to schedule the transmission of the second audio upon a recognition of the user as an authorized user.

13. The system of claim 5,
wherein the input device is a sensor,
wherein the input is an alert provided by the sensor, the alert being recognizable by the controller,
wherein the controller is operable to schedule the transmission of the second audio signal containing information related to the alert.

14. The system of claim 5,
wherein the input device is an audio interface in the mobile device operable to detect a Doppler shift in the first audio signal, the Doppler shift indicating motion of the mobile device,
wherein the input is an indication that the mobile device is moving, and
wherein the controller is operable to schedule the transmission of the second audio signal, the second audio signal containing Doppler information in an ultrasonic pulse longer than the first audio signal for obtaining a Doppler measurement of the ultrasonic pulse.

15. The system of claim 1, wherein the controller is further operable to:
characterize a power profile of the second audio signal, the power profile defining at least one of a heating limit and a voltage drop limit for each of the plurality of transmitters, and
instruct the at least some of the plurality of transmitters to emit the second audio signal pursuant to the power profile.

16. The system of claim 1, wherein the interference parameter is at least one of a sound pressure level, a frequency, a reverberation time, and time slot.

17. A method of providing an audio signal in a venue employing ultrasonic locationing, the method comprising the steps of:
providing a plurality of transmitters, each of the plurality of transmitters operable to emit a first audio signal and a second audio signal, the first audio signal being an ultrasonic burst emitted at a first frequency, the second signal being emitted at a second frequency that is different from the first frequency;
instructing, by a controller, each of the plurality of transmitters to emit the first audio signal pursuant to a predefined scheduling sequence;
determining an interference effect of the second audio signal on the first audio signal;
based on the interference effect, determining an interference parameter for the second audio signal, the interference parameter causing an avoidance of an interference between the first audio signal and the second audio signal; and
instructing, by the controller, at least some of the plurality of transmitters to emit the second audio signal pursuant to the interference parameter;
receiving, by a mobile device, the first audio signal; and
communicating, by the mobile device, a receipt of the first audio signal to the controller.

18. The method of claim 17, wherein the second frequency is ultrasonic.

19. The method of claim 17, wherein the second frequency is audible.

20. The method of claim 17, wherein the interference parameter is at least one of a sound pressure level, a frequency, a reverberation time, and time slot.

* * * * *